(12) United States Patent
Park et al.

(10) Patent No.: US 11,777,860 B2
(45) Date of Patent: Oct. 3, 2023

(54) ELECTRONIC DEVICE FOR TRANSCEIVING VIDEO PACKET AND OPERATING METHOD THEREOF

(71) Applicant: Samsung Electronics Co., Ltd., Suwon-si (KR)

(72) Inventors: Byeongjo Park, Hwaseong-si (KR); Sungyeon Kim, Seoul (KR); Kukjin Kim, Hwaseong-si (KR); Sungjun Park, Suwon-si (KR); Jeongbae Seo, Yongin-si (KR); Byungho An, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 37 days.

(21) Appl. No.: 17/501,470

(22) Filed: Oct. 14, 2021

(65) Prior Publication Data
US 2022/0286400 A1   Sep. 8, 2022

(30) Foreign Application Priority Data

Mar. 2, 2021 (KR) .......................... 10-2021-0027706

(51) Int. Cl.
*H04L 47/2416* (2022.01)
*H04L 43/16* (2022.01)
(Continued)

(52) U.S. Cl.
CPC ........ *H04L 47/2416* (2013.01); *H04L 1/1874* (2013.01); *H04L 43/16* (2013.01); *H04L 47/32* (2013.01)

(58) Field of Classification Search
CPC ... H04L 47/2416; H04L 1/1874; H04L 43/16; H04L 47/32
See application file for complete search history.

(56) References Cited

U.S. PATENT DOCUMENTS 6,421,387 B1   7/2002   Rhee
7,124,333 B2   10/2006  Fukushima et al.
(Continued)

FOREIGN PATENT DOCUMENTS

EP       2627054 B1         12/2018
JP       6145127 B2          6/2017
KR   10-2019-0046510 A       5/2019

OTHER PUBLICATIONS

Hong, D. et al. "H.264 Hierarchical P Coding in the Context of Ultra-low Delay, Low Complexity Applications." 28th Picture Coding Symposium, PCS2010, Dec. 8-10, 2010.

*Primary Examiner* — Min Jung
(74) *Attorney, Agent, or Firm* — Harness, Dickey & Pierce, P.L.C.

(57) ABSTRACT

An electronic device includes a NACK buffer configured to temporarily store first packets and second packets, and processing circuitry configured to generate a plurality of frames, which include reference frames depending on decoding of another frame and non-reference frames independent of decoding of another frame, based on hierarchical predictive (P) coding, generate the first packets forming the reference frames and the second packets forming the non-reference frames, based on the plurality of frames, transmit the first packets and the second packets to an external device, receive a NACK request indicating retransmission target packets that have failed to be received by the external device, determine to not retransmit at least some of the retransmission target packets corresponding to the NACK request.

20 Claims, 12 Drawing Sheets

(51) Int. Cl.
*H04L 47/32* (2022.01)
*H04L 1/1867* (2023.01)

(56) References Cited

U.S. PATENT DOCUMENTS

| | | |
|---|---|---|
| 7,562,277 B2 | 7/2009 | Park et al. |
| 8,370,694 B2 | 2/2013 | Henocq et al. |
| 9,077,964 B2 | 7/2015 | Cipolli et al. |
| 9,398,337 B2 | 7/2016 | Lee et al. |
| 10,009,628 B2* | 6/2018 | Bushell ............... H04N 19/132 |
| 10,715,284 B2 | 7/2020 | Rollet |
| 2009/0232202 A1 | 9/2009 | Chen et al. |
| 2010/0086024 A1 | 4/2010 | Zhang et al. |
| 2010/0125768 A1* | 5/2010 | Mauchly ............... H04N 19/89 |
| | | 714/E11.113 |
| 2011/0235709 A1* | 9/2011 | Shi ...................... H04N 19/132 |
| | | 375/E7.243 |
| 2018/0220148 A1* | 8/2018 | Ikonin ................. H04N 19/523 |
| 2018/0220162 A1* | 8/2018 | Sychev ................. H04N 19/51 |
| 2018/0332293 A1 | 11/2018 | Park et al. |
| 2018/0343098 A1 | 11/2018 | Goel et al. |
| 2019/0268601 A1* | 8/2019 | Lu ....................... H04N 19/105 |

\* cited by examiner

ELECTRONIC DEVICE FOR TRANSCEIVING VIDEO PACKET AND OPERATING METHOD THEREOF

CROSS-REFERENCE TO RELATED APPLICATION

This application is based on and claims the benefit of priority under 35 U.S.C. § 119 to Korean Patent Application No. 10-2021-0027706, filed on Mar. 2, 2021, in the Korean Intellectual Property Office, the disclosure of which is incorporated by reference herein in its entirety.

BACKGROUND

The inventive concepts relate to an electronic device and an operating method thereof, and more particularly, to an electronic device for transceiving a video packet and an operating method thereof.

To meet wireless data traffic demand that is growing since commercialization of fourth generation (4G) communication systems, many efforts have been put to develop improved fifth generation (5G) or pre-5G communication systems. For this reason, 5G or pre-5G communication systems are also called beyond-4G-network communication systems or post long term evolution (LTE) systems.

With the introduction of 5G communication systems, a round trip time (RTT) has been decreased from 200 ms to 5 ms, and there is a demand for a video packet transmitting method that keeps a provided maximum bandwidth and is robust to packet loss when services, such as a video call service and a streaming service, for which a real time characteristic is critical, are provided.

SUMMARY

The inventive concepts provide an electronic device for generating a non-reference frame based on hierarchical P coding by transceiving a video packet based on hierarchical predictive (P) coding, thereby reducing or preventing a video playback error from occurring because packet retransmission is not performed due to maximum bandwidth limitation.

According to some example embodiments of the inventive concepts, there is provided an electronic device including a NACK buffer configured to temporarily store first packets and second packets and processing circuitry configured to, generate a plurality of frames based on hierarchical P coding, the plurality of frames including reference frames and non-reference frames, the reference frames depending on decoding of another frame, and the non-reference frames being independent of decoding of another frame, generate the first packets and second packets based on the plurality of frames, the first packets forming the reference frames, and the second packets forming the non-reference frames, transmit the first packets and the second packets to an external device, receive a NACK request indicating retransmission target packets that have failed to be received by the external device, determine not to retransmit at least some of the retransmission target packets corresponding to the NACK request.

According to some example embodiments of the inventive concepts, there is provided an electronic device including processing circuitry configured to, generate a plurality of frames based on hierarchical P coding, the plurality of frames including reference frames and non-reference frames, the reference frames depending on decoding of another frame, and the non-reference frames being independent of decoding of another frame, determine a frame drop with respect to some of the plurality of frames based on transmission traffic and a frame type, generate first packets by packetizing the reference frames and generate second packets by packetizing the non-reference frames, transmit the first packets and the second packets to an external device, and monitor whether the transmission traffic exceeds maximum traffic, the transmission traffic being based on a size of the first and second packets transmitted to the external device.

According to some example embodiments of the inventive concepts, there is provided an electronic device including a NACK buffer configured to temporarily store first, second, and third packets, and processing circuitry configured to, sequentially generate a first frame, a second frame, and a third frame based on hierarchical P coding, determine whether to perform packetization on each of the first through third frames, generate the first packets corresponding to the first frame, the second packets corresponding to the second frame, and the third packets corresponding to the third frame, transmit the first through third packets to an external device, monitor real-time transmission traffic and determine whether the real-time transmission traffic exceeds a threshold traffic, receive a NACK request indicating retransmission target packets that have failed to be received by the external device, and determine not to retransmit at least some of the retransmission target packets corresponding to the NACK request, wherein the second frame is a non-reference frame independent of decoding of another frame, and each of the first frame and the third frame is a reference frame depending on decoding of another frame.

BRIEF DESCRIPTION OF THE DRAWINGS

Some example embodiments of the inventive concepts will be more clearly understood from the following detailed description taken in conjunction with the accompanying drawings in which.

DETAILED DESCRIPTION

Figure 1:
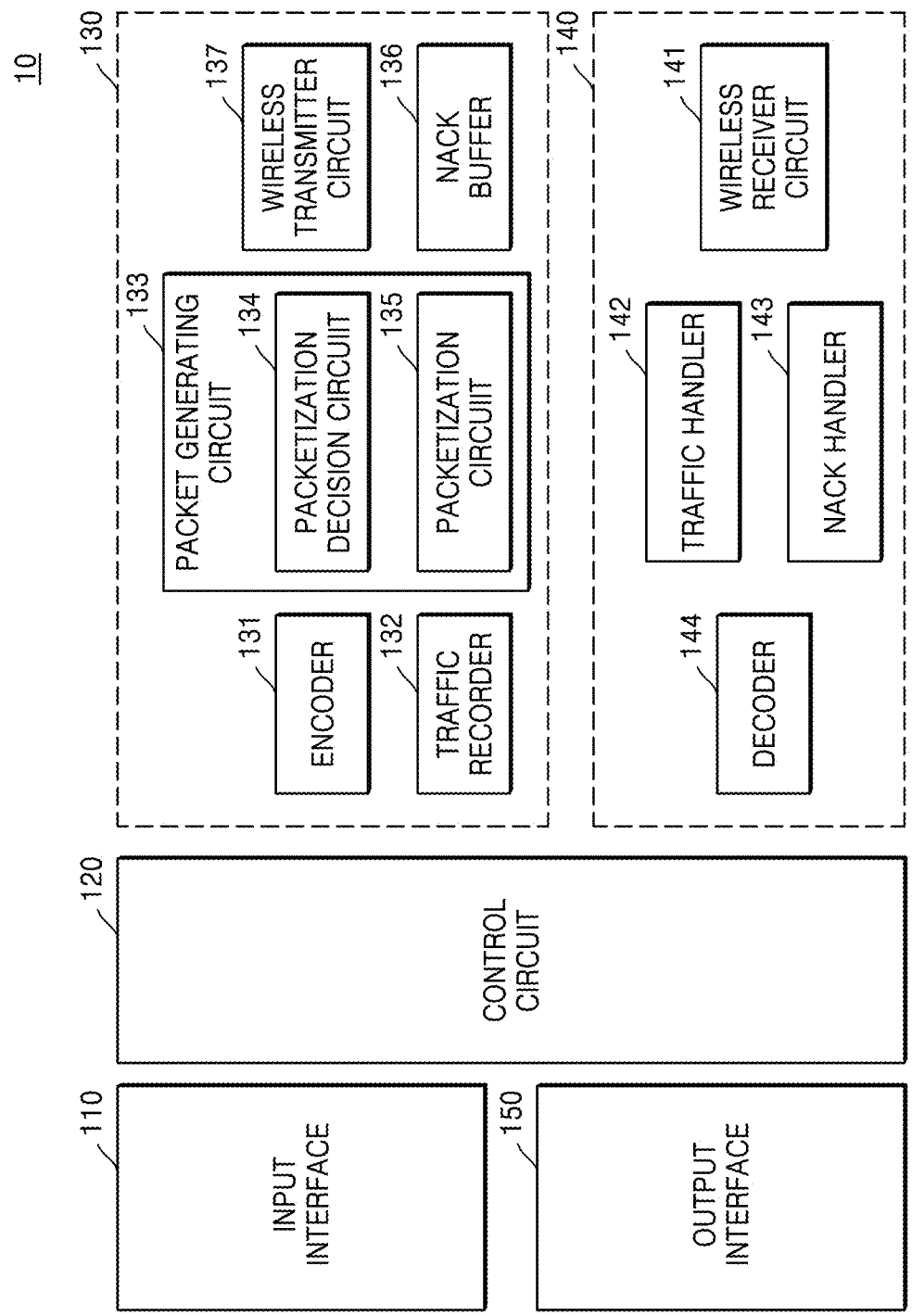
FIG. 1 is a block diagram of an electronic device according to example embodiments.

FIG. 1 is a block diagram of an electronic device according to example embodiments.

Referring to FIG. 1, an electronic device 10 may include an input interface 110, a control circuit 120, a packet transmitting circuit 130, a packet receiving circuit 140, and/or an output interface 150.

According to various embodiments, the electronic device 10 may be implemented as user equipment (UE) that transmits video packets. For example, the electronic device 10 may perform a video call with an external device (not shown). The external device may be called receiving UE. For example, the electronic device 10 may correspond to a server of a streaming service provider.

According to various embodiments, the input interface 110 may include interface units for receiving a video. For example, when the electronic device 10 operates as transmitting UE and performs a video call with the receiving UE, the input interface 110 may correspond to a camera (not shown) of the transmitting UE. The electronic device 10 may receive an external image and/or video through the camera, perform packetization, and transmit packets to the receiving UE.

According to various embodiments, the control circuit 120 may generally control operations of the electronic device 10. For example, the control circuit 120 may execute a video call application and control the electronic device 10 to transmit a video packet through a wireless transmitter circuit 137. For example, the control circuit 120 may execute an application for real-time streaming and control the electronic device 10 to receive a video packet from a server (not shown) of a streaming provider through a wireless receiver circuit 141. The control circuit 120 may include at least one processor or microprocessor or may be a part of a processor.

According to various embodiments, the packet transmitting circuit 130 may encode a video to be transmitted and transmit an encoded video to an external device (not shown). The packet transmitting circuit 130 may include an encoder 131, a traffic recorder 132, a packet generating circuit 133, a wireless transmitter circuit 137, and/or a NACK buffer 136.

The encoder 131 may encode image data. For example, the encoder 131 may encode a frame. According to an embodiment, the encoder 131 may change an encoding mode according to a control signal. The control circuit 120 may transmit different signals to the encoder 131 according to executed applications. For example, when a slow-motion function or a time-lapse function is activated in a camera application or when a video call application for which seamless video streaming is important is executed, the control circuit 120 may transmit a control signal indicating hierarchical predictive (P) coding to the encoder 131. The encoder 131 may perform hierarchical P coding on a frame from the moment when the control signal is received. The hierarchical P coding will be described below.

The traffic recorder 132 may measure and monitor transmission traffic in real time. For example, each (or one or more) time when a video packet generated by the packet generating circuit 133 is transmitted, the traffic recorder 132 may receive and record size information of the video packet. When the traffic recorder 132 receives a request for real-time traffic information from the packet generating circuit 133, the traffic recorder 132 may send, to the packet generating circuit 133, a response corresponding to real-time traffic information at the reception of the request. For example, in response to a request for real-time traffic information from the packet generating circuit 133, the traffic recorder 132 may send a response indicating whether real-time traffic exceeds maximum traffic at the time when the request is received. The term maximum traffic used herein may mean a threshold traffic.

The packet generating circuit 133 may receive an encoded frame from the encoder 131 and generate a video packet from the encoded frame. According to various embodiments, the packet generating circuit 133 may not convert all received frames into video packets but generate a video packet according to predefined (or alternately given) conditions or drop a received frame. A packetization decision circuit 134 included in the packet generating circuit 133 may decide to perform a frame drop based on the kind of the frame and whether maximum traffic is exceeded. The frame drop will be described in detail below.

The NACK buffer 136 may temporarily store video packets transmitted to an external device (not shown). The packet generating circuit 133 may generate a video packet based on a received frame and temporarily store the video packet in the NACK buffer 136. Video packets are temporarily stored in the NACK buffer 136 in order to retransmit a video packet, which has failed to be transmitted to an external device (not shown), when a NACK request is received.

According to various embodiments, the packet receiving circuit 140 may process at least one request received from an external device (not shown). For example, at least one request may include a NACK request, a traffic change request, or a video packet received from an external device (not shown). The packet receiving circuit 140 may decode a received video packet into an image, retransmit a video packet in response to a NACK request, and/or change a maximum traffic value. The packet receiving circuit 140 may include the wireless receiver circuit 141, a traffic handler 142, a NACK handler 143, and/or a decoder 144.

The NACK handler 143 may determine whether to perform retransmission when receiving a NACK request. The NACK handler 143 may decode a NACK request, identify a sequence number of a packet, which has failed to be transmitted, and/or query the NACK buffer 136 for the packet corresponding to the sequence number. The NACK handler 143 may ignore the NACK request or retransmit the packet to an external device (not shown) based on the packet received from the NACK buffer 136. The NACK handler 143 will be described in detail below.

The traffic handler 142 may control setting values of the traffic recorder 132 and the encoder 131 when receiving a traffic change request. For example, when a maximum traffic value is increased, the traffic handler 142 may transmit a control signal to the traffic recorder 132 such that the increased maximum traffic value is reflected. The traffic handler 142 may change a bit rate value of the encoder 131 to correspond to the increased maximum traffic value. The traffic handler 142 will be described in detail below.

The decoder 144 may decode received video packets and obtain an image frame. According to an embodiment, the decoder 144 may change a decoding mode according to a control signal. The decoding mode may be changed to correspond to an operation mode of the encoder 131 transmitting a video packet. For example, when a video packet encoded based on hierarchical P coding is received, the control circuit 120 may transmit a control signal indicating hierarchical P coding to the decoder 144.

It has been described above that the electronic device 10 transmits and receives video packets through the wireless transmitter circuit 137 and the wireless receiver circuit 141, but embodiments are not limited thereto. According to various embodiments, the electronic device 10 may also be applied to networks using a wired interface (e.g., Ethernet).

In at least one embodiment, a described function may be performed by hardware, software, firmware, or a combination thereof. When a function is performed by software, the function may be stored in or transmitted to a computer-readable medium as at least one instruction or code. The computer-readable medium may include a computer storage medium and any communication medium including a medium facilitating transmission of a computer program from one place to another.

In at least one example embodiment, the control circuit 120, the packet transmitting circuit 130 and/or the packet receiving circuit 140 may be disposed on different parts of the electronic device 10. For example, FIG. 1 shows the packet transmitting circuit 130 and the packet receiving circuit 140 as discrete circuits, separate from the control circuit 120. However, example embodiments are not limited thereto. For example, in some example embodiments, the packet transmitting circuit 130 and/or the packet receiving circuit 140 may be part of and/or included in the control circuit 120.

Figure 2A:
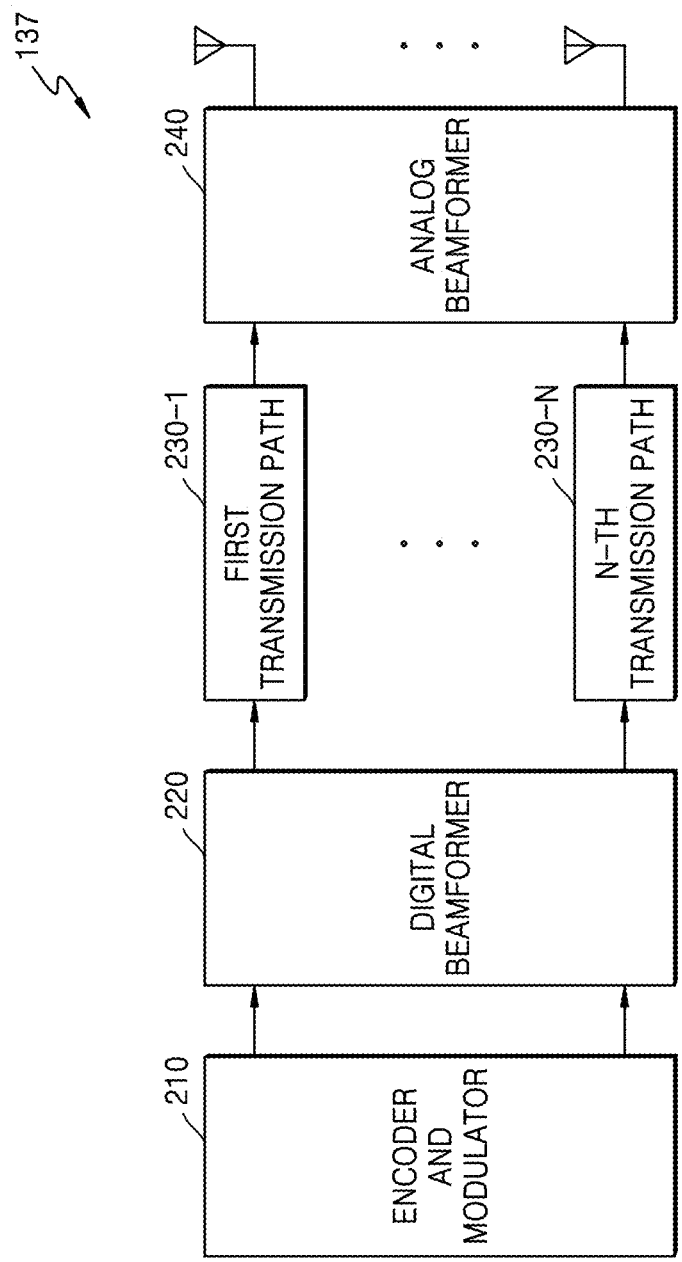
FIG. 2A is a block diagram of a wireless transmitter circuit according to example embodiments.

FIG. 2A is a block diagram of a wireless transmitter circuit according to example embodiments.

Referring to FIG. 2A, the wireless transmitter circuit 137 may include an encoder and modulator 210, a digital beamformer 220, first through N-th transmission paths 230-1 through 230-N, and/or an analog beamformer 240.

The encoder and modulator 210 may perform channel encoding. For channel encoding, at least one selected from a low density parity check (LDPC) code, a convolution code, and/or a polar code may be used. The encoder and modulator 210 may generate modulated symbols by performing constellation mapping.

The digital beamformer 220 may perform beamforming on digital signals (e.g., modulated symbols). For this operation, the digital beamformer 220 may multiply the modulated symbols by beamforming weights. At this time, the beamforming weights may be used to change the magnitude and phase of a signal and called a precoding matrix or a precoder. The digital beamformer 220 may output digitally beamformed modulated symbols to the first through N-th transmission paths 230-1 through 230-N. At this time, according to a multiple-input multiple-output (MIMO) transmission scheme, the modulated symbols may be multiplexed, or the same modulated symbols are provided to the first through N-th transmission paths 230-1 through 230-N.

The first through N-th transmission paths 230-1 through 230-N may convert digitally beamformed digital signals into analog signals. For this operation, each or one or more of the first through N-th transmission paths 230-1 through 230-N may include an inverse fast Fourier transform (IFFT) operator, a cyclic prefix (CP) inserter, a digital-to-analog converter (DAC), and/or an up-converter. The CP inserter is for an orthogonal frequency division multiplexing (OFDM) scheme and may be omitted when a different physical layer scheme (e.g., a filter bank multi-carrier (FBMC) scheme) is used. In other words, the first through N-th transmission paths 230-1 through 230-N may provide independent signal processing for multiple streams generated through digital beamforming. However, some of the elements of the first through N-th transmission paths 230-1 through 230-N may be shared according to implementation methods.

The analog beamformer 240 may perform beamforming on analog signals. For this operation, the analog beamformer 240 may multiply the analog signals by beamforming weights. At this time, the beamforming weights may be used to change the magnitude and phase of a signal.

Figure 2B:
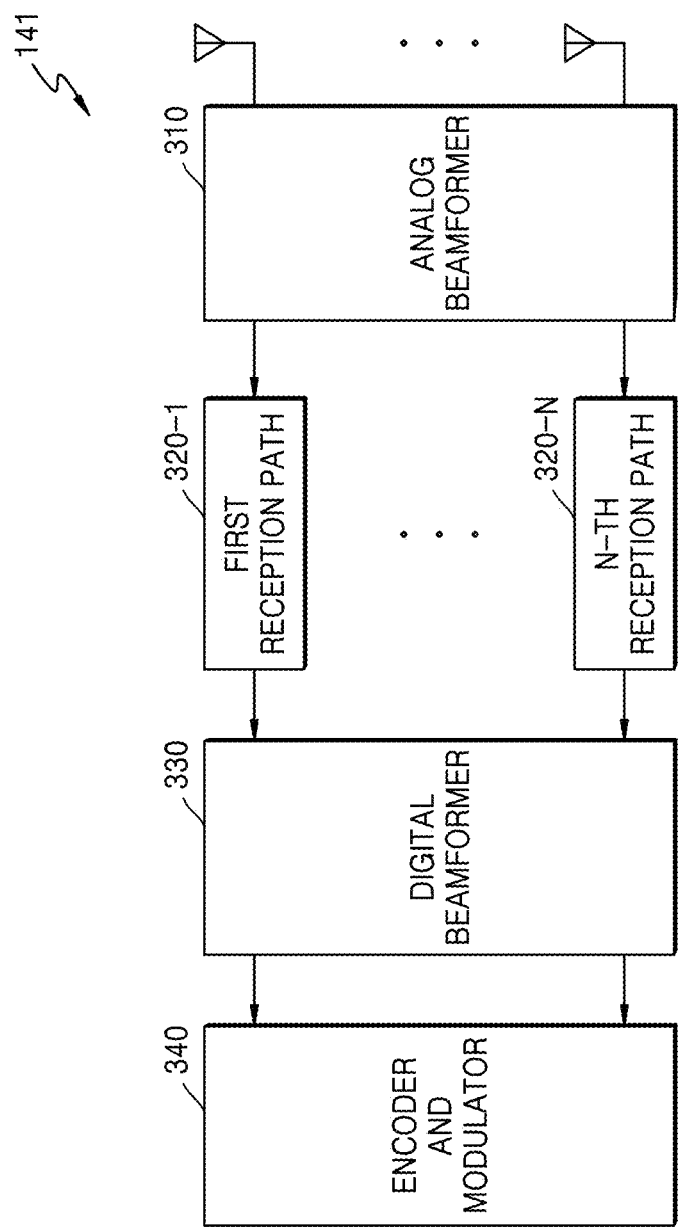
FIG. 2B is a block diagram of a wireless receiver circuit according to example embodiments.

FIG. 2B is a block diagram of a wireless receiver circuit according to example embodiments.

Referring to FIG. 2B, the wireless receiver circuit 141 may include a decoder and demodulator 340, a digital beamformer 330, first through N-th reception paths 320-1 through 320-N, and/or an analog beamformer 310.

The decoder and demodulator 340 may perform channel decoding. For the channel decoding, at least one selected from an LDPC code, a convolution code, a polar code, and/or a turbo code may be used.

According to various embodiments, the digital beamformer 330 and the analog beamformer 310 may respectively correspond to the digital beamformer 220 and the analog beamformer 240 in FIG. 2A. The first through N-th reception paths 320-1 through 320-N may convert beamformed analog signals into digital signals. For this operation, each or one or more of the first through N-th reception paths 320-1 through 320-N may include a fast Fourier transform (FFT) operator, an analog-to-digital converter (ADC), a CP remover, a serial-to-parallel converter, and/or a down-converter. In detail, each or one or more of the first through N-th reception paths 320-1 through 320-N may generate a serial time-domain baseband signal by down-converting a received signal into a baseband frequency and removing a CP from the received signal, convert the serial time-domain baseband signal into parallel time-domain signals, generate N parallel frequency-domain signals by performing an FFT algorithm on the parallel time-domain signals, and convert the N parallel frequency-domain signals into a sequence of modulated data symbols. In other words, the first through N-th reception paths 320-1 through 320-N may provide independent signal processing for multiple streams generated through analog beamforming. However, some of the elements of the first through N-th reception paths 320-1 through 320-N may be shared according to implementation methods.

Figure 3A:
FIG. 3A illustrates an example of frames based on IPPP coding.

FIG. 3A illustrates an example of frames based on IPPP coding.

Referring to FIG. 3A, a first frame I1 and second through tenth frames P2 through P10 may be generated based on IPPP coding. In IPPP coding, the first frame I1 may correspond to an intra (I)-frame. An intra (I)-frame may refer to a frame in which intra coding is performed on all macroblocks therein. In other words, an I-frame may be independently decoded without referring to another image. The I-frame may be called a key frame.

The second through tenth frames P2 through P10 may correspond to predictive (P)-frames. A P-frame may refer to a frame in which an inter-coding is performed on at least one macroblock therein. The inter-coding may refer to a coding method based on motion estimation. In other words, inter-prediction may be performed on a current frame based on a previous frame, and a P-frame may include a difference value between the current frame and an actual macroblock value and motion vector information indicating the previous frame.

The first frame I1 and the second through ninth frames P2 through P9 may be called reference frames. A reference frame may be referred to by another frame. For example, the first frame I1 corresponding to an I-frame may be referred to by at least one selected from the second through tenth frames P2 through P10. For example, the third frame P3 may be referred to by at least one selected from the fourth through tenth frames P4 through P10 thereafter.

The tenth frame P10 may be called a non-reference frame. In other words, the tenth frame P10 may be encoded and decoded with reference to other frames, but other frames (e.g., the first frame I1 and the second through ninth frames P2 through P9) may neither be encoded nor decoded with reference to the tenth frame P10.

Figure 3B:
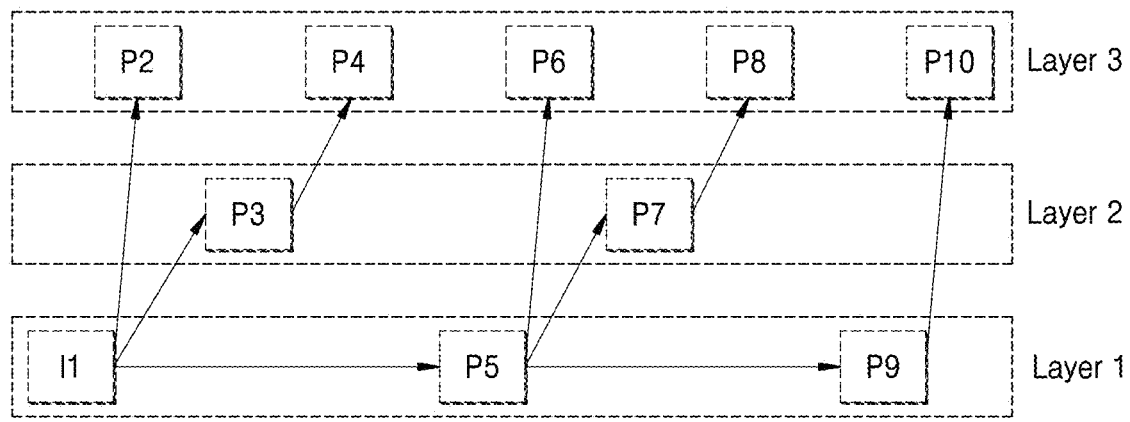
FIG. 3B illustrates an example of frames based on hierarchical predictive (P) coding, according to example embodiments.

FIG. 3B illustrates an example of frames based on hierarchical P coding, according to example embodiments.

Referring to FIG. 3B, the first frame I1 and the second through tenth frames P2 through P10 may be generated based on hierarchical P coding.

According to various embodiments, the first frame I1 and the second through tenth frames P2 through P10 may correspond to at least two layers. For example, referring to FIG. 3B, the first frame I1, the fifth frame P5, and the ninth frame P9 may correspond to a first layer Layer 1. The third frame P3 and the seventh frame P7 may correspond to a second layer Layer 2. The second frame P2, the fourth frame P4, the sixth frame P6, the eighth frame P8, and the tenth frame P10 may correspond to a third layer Layer 3.

The highest layer (e.g., the third layer Layer 3 in FIG. 3B) may include only non-reference frames. In other words, the second frame P2 may be encoded and decoded referring to the first frame I1, the fourth frame P4 may be encoded and decoded referring to the third frame P3, the sixth frame P6 may be encoded and decoded referring to the fifth frame P5, the eighth frame P8 may be encoded and decoded referring to the seventh frame P7, and the tenth frame P10 may be encoded and decoded referring to the ninth frame P9. In other words, frames in the highest layer may not be referred to for encoding and decoding of the other frames, and the other layers excluding the highest layer may include only reference frames.

According to various embodiments, when the electronic device 10 encodes transmission frames using hierarchical P coding, the transmission frames may be transmitted according to a certain pattern. For example, when the electronic device 10 encodes transmission frames according to the H.265 standard, real-time transport protocol (RTP) packets to be transmitted may be encoded each (or one or more) including a traffic identifier (TID) value. The TID value indicates the relative importance of an RTP packet and may be different according to a layer of the hierarchical P coding. For example, the TID value of RTP packets corresponding to reference frames in the lowest layer (e.g., the first layer Layer 1) may be 0 that is the least value. For example, the TID value of RTP packets corresponding to non-reference frames in the highest layer (e.g., the third layer Layer 3) may be 3. In other words, when the importance of an RTP packet is high (that is, in the case of a reference frame that is necessarily referred to for decoding of another frame), a TID value may be low. The certain pattern may correspond to a pattern of TID values. For example, when an RTP stream is generated based on hierarchical P coding as shown in FIG. 3B, TID values of RTP packets to be transmitted may have a repetitive pattern of (0, 2, 1, 2). The repetitive pattern may be based on 0 that is the TID value of the first frame I1, 2 that is the TID value of the second frame P2, 1 that is the TID value of the third frame P3, and 2 that is the TID value of the fourth frame P4. According to various embodiments, when the electronic device 10 drops at least some frames (e.g., non-reference frames) according to whether maximum traffic is exceeded, the TID values of RTP packets received by an external device (not shown), which receives a video packet, may not be based on the repetitive pattern. For example, in the case where maximum traffic is fully occupied when the fourth frame P4 is transmitted, the electronic device 10 may not packetize the fourth frame P4. In this case, when the TID values of frames received by an external device (not shown) are sequentially shown, a TID pattern may be expressed as (0, 2, 1, 0, . . . ). For example, when the electronic device 10 receives a video packet and the TID pattern of received frames is not regularly repeated, it may be identified that an external device (not shown) transmits RTP packets using a frame drop based on a maximum bandwidth.

Figure 4:
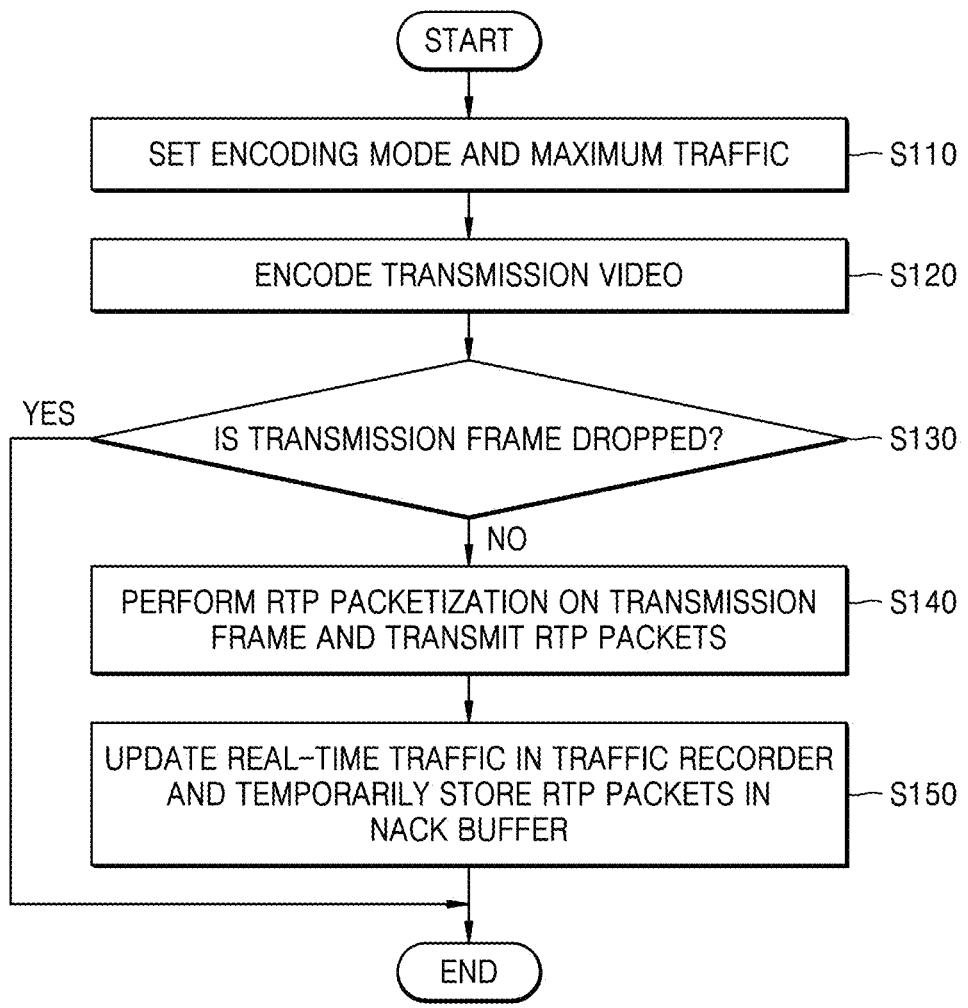
FIG. 4 is a flowchart of an operating method of an electronic device, according to example embodiments.

FIG. 4 is a flowchart of an operating method of an electronic device, according to example embodiments.

Referring to FIG. 4, the electronic device 10 may set an encoding mode and maximum traffic in operation S110. The encoding mode may include IPPP coding and hierarchical P coding. As described with reference to FIG. 1, the control circuit 120 may transmit a control signal indicating hierarchical P coding to the encoder 131 in response to execution of a video call application, for which provision of seamless video streaming is critical. The encoder 131 may change internal encoding settings in response to the control signal such that hierarchical P coding is performed. The electronic device 10 may send a maximum traffic value to the traffic recorder 132. The maximum traffic value may be identified by an upper-layer protocol (e.g., a session description protocol (SDP)), which determines details necessary to establish a user datagram protocol (UDP) session for the RTP between the electronic device 10 and an external device (not shown). The electronic device 10 may send the maximum traffic value identified during the establishment of a UDP session to the traffic recorder 132. The traffic recorder 132 may compare the maximum traffic value with a real-time traffic value and determine whether the maximum traffic is exceeded. According to an embodiment, the electronic device 10 may send the maximum traffic value to the encoder 131. The encoder 131 may set values to perform hierarchical P coding according to the encoding mode indicated by the control signal and set a bit rate value to efficiently use the maximum traffic.

The electronic device 10 may encode a transmission video in operation S120. At this time, the encoder 131 may encode a plurality of frames based on hierarchical P coding. At least one of the frames may correspond to a non-reference frame.

The electronic device 10 may determine whether to drop a transmission frame in operation S130. The packet generating circuit 133 of the electronic device 10 may drop a transmission frame based on the packetization decision circuit 134. For example, in the case where transmission traffic exceeds the maximum traffic at the time when a frame received from the encoder 131 is transmitted and the frame corresponds to a non-reference frame, the packetization decision circuit 134 may drop the frame. Operation S130 will be described in detail below with reference to FIG. 5.

The electronic device 10 may perform RTP packetization on the transmission frame and transmit RTP packets to an external device (not shown) in operation S140. The electronic device 10 may determine to transmit the transmission frame to the external device when real-time traffic does not exceed the maximum traffic or when the transmission frame is a reference frame even though the real-time traffic exceeds the maximum traffic. The packet generating circuit 133 may divide the transmission frame into RTP packets using the packetization circuit 135 and transmit the RTP packets to the external device.

The electronic device 10 may update real-time traffic in the traffic recorder 132 and temporarily store the RTP packets in the NACK buffer 136 in operation S150. According to various embodiments, the control circuit 120 may provide the traffic recorder 132 with the size of the transmitted RTP packets. The traffic recorder 132 may monitor in real time whether transmission traffic exceeds the maximum traffic based on size information received from the wireless transmitter circuit 137. In addition, to be ready for a NACK request for packet retransmission in the case of reception failure of the external device, the control circuit 120 may temporarily store the transmitted RTP packets in the NACK buffer 136.

Figure 5:
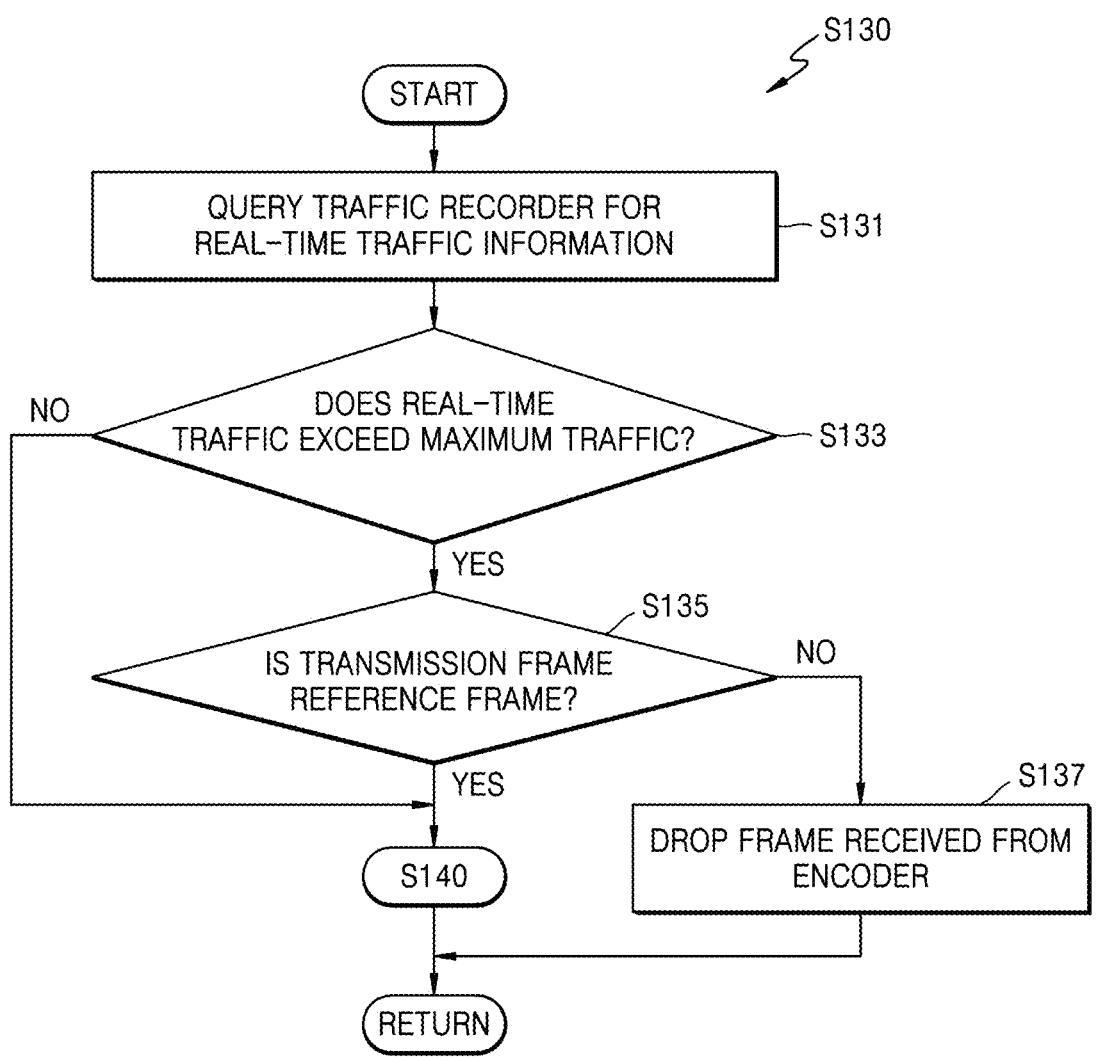
FIG. 5 is a flowchart of an operating method of an electronic device determining a frame drop, according to example embodiments.

FIG. 5 is a flowchart of an operating method of an electronic device determining a frame drop, according to example embodiments.

Referring to FIG. 5, the packetization decision circuit 134 may query the traffic recorder 132 for real-time traffic information in operation S131. When packets are transmitted exceeding the maximum traffic, packetization may not be performed because transmission is highly likely to fail.

The packetization decision circuit 134 may determine whether real-time traffic exceeds the maximum traffic in operation S133. In response to the query, the traffic recorder 132 may send the packetization decision circuit 134 a response indicating the real-time traffic information or whether the maximum traffic has been exceeded. The packetization decision circuit 134 may determine whether real-time transmission traffic exceeds the maximum traffic, based on the response from the traffic recorder 132. The packetization decision circuit 134 may determine to packetize the transmission frame when the real-time transmission traffic does not exceed the maximum traffic.

The packetization decision circuit 134 may determine whether the transmission frame is a reference frame in operation S135 and determine whether to drop the transmission frame in operation S137. Referring to FIG. 3B together, a reference frame is a frame that is referred to for encoding and decoding of another frame, and frames excluding frames in the highest layer (e.g., the third layer Layer 3) may be reference frames. For example, referring to FIG. 3B together, among the first frame I1 and the second through tenth frames P2 through P10, the frames excluding the second frame P2, the fourth frame P4, the sixth frame P6, the eighth frame P8, and the tenth frame P10 may correspond to reference frames. For example, when the transmission frame is the third frame P3, packetization may be determined because the third frame P3 is referred to by the fourth frame P4. For example, when the transmission frame is the sixth frame P6, packetization may be bypassed because there is no frame referring to the sixth frame P6. Because the transmission frame is not necessary to decode other frames when the transmission frame is a non-reference frame, a video may be played even when the packets of a non-reference frame fail to be transmitted. Accordingly, the packetization decision circuit 134 may drop a non-reference frame, which is not necessary for video playback, in a communication environment in which the maximum traffic is exceeded, such that the non-reference frame is not packetized.

Figure 6:
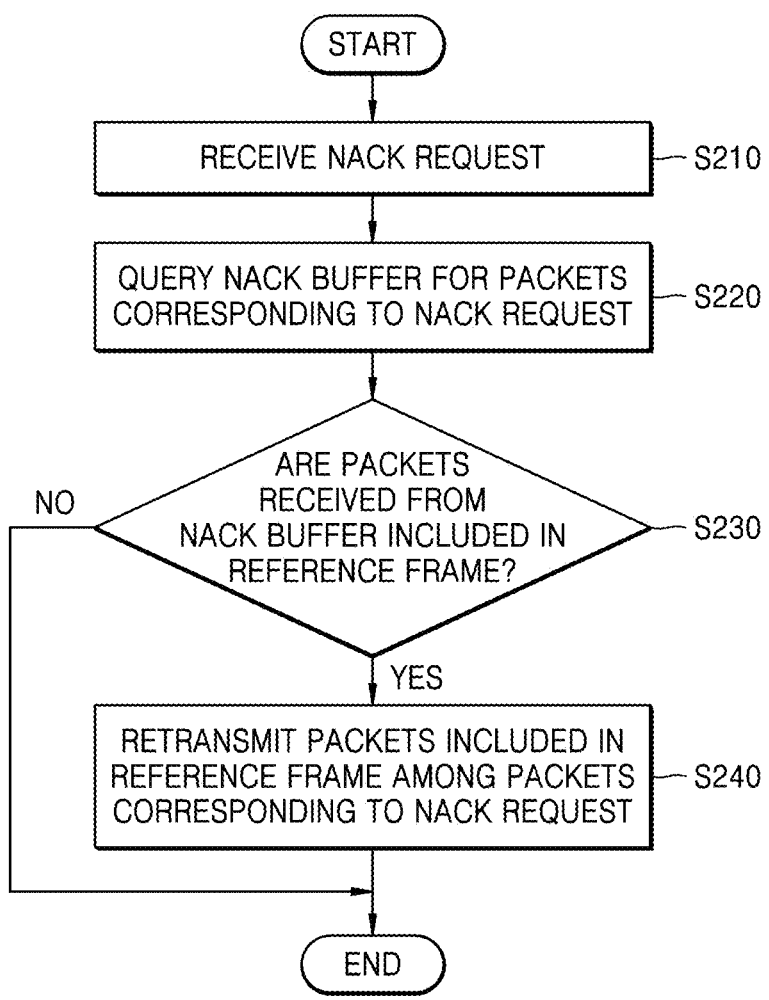
FIG. 6 is a flowchart of an operating method of an electronic device upon receipt of a retransmission request, according to example embodiments.

FIG. 6 is a flowchart of an operating method of an electronic device upon receipt of a retransmission request, according to example embodiments.

Referring to FIG. 6, the electronic device 10 may receive a NACK request in operation S210. The NACK request may correspond to a signal that requests the electronic device 10 to retransmit packets, which have been transmitted by the electronic device 10 but failed to be received by an external device (not shown). According to various embodiments, the external device may include a sequence number in the NACK request. The external device may include a sequence number of a packet, which has failed to be received by the external device, in the NACK request. According to an embodiment, the external device may transmit the NACK request, which includes sequence numbers of up to sixteen packets, to the electronic device 10. The NACK request may include a packet ID (PID), which includes the identifier of a packet failed to be transmitted, and a bitmask of following lost packets (BLP), which includes a bitmask of packets failed to be transmitted. The PID may include two bytes representing a sequence number (e.g., 0 to 65,535). The BLP may additionally indicate packets, which have failed to be transmitted, in a range up to sixteen packets starting from the packet corresponding to the sequence number indicated by the PID. For example, when the external device fails to receive only the 13,197th packet, the PID may include a 2-byte value indicating 13197 and a BLP value may be 0. This is because there is no following packet that failed to be transmitted among a maximum of sixteen packets starting from the 13,197th packet. For example, when the external device fails to receive the 29,897th through 29,900th packets, the PID may include a 2-byte value indicating 29897 and the BLP may include a value indicating the remaining 29,898th to 29,900th packets. When the 29,897th to 29,900th packets have failed to be received, a BLP value may correspond to 0x0007.

The NACK handler 143 may query the NACK buffer 136 for packets corresponding to the NACK request in operation S220 As described above with reference to FIG. 4, each (or one or more) time when the electronic device 10 transmits an RTP packet, the electronic device 10 may transmit the RTP packet to the NACK buffer 136 and perform backup of the RTP packet. Accordingly, the NACK buffer 136 temporarily stores all RTP packets that have been transmitted to the external device as long as a buffer size allows. The NACK handler 143 may decode the NACK request and obtain sequence numbers of RTP packets failed to be transmitted but may not identify with only the sequence numbers whether the transmission-failed RTP packets are based on a non-reference frame or a reference frame. The NACK handler 143 may not make a decision about retransmission because the NACK handler 143 may not identify which frame the transmission-failed RTP packets are based on. Accordingly, the NACK handler 143 may query the NACK buffer 136 for the RTP packets corresponding to the sequence numbers. The NACK buffer 136 may transmit packets, which correspond to the sequence numbers received from the NACK handler 143, to the NACK handler 143.

The NACK handler 143 may determine whether the packets received from the NACK buffer 136 are included in a reference frame in operation S230. In an embodiment, according to the H.264 standard, the NACK handler 143 may identify a non-reference indicator (NRI) value by decoding the header of an RTP packet received from the NACK buffer 136. The NRI value indicates whether a frame corresponding to a certain RTP packet is a reference frame or a non-reference frame. According to various embodiments, an NRI value of 0 may indicate that the corresponding frame is a non-reference frame, and an NRI value of 1 to 3 other than 0 may indicate that the corresponding frame is a reference frame. For example, when an RTP packet corresponding to sequence number 10 is included in the third frame P3, the NRI value of the RTP packet may be 1, 2, or 3. For example, when an RTP packet corresponding to sequence number 15 is included in the sixth frame P6, the NRI value of the RTP packet may be 0. In other words, the NACK handler 143 may obtain an NRI value by decoding the header of an RTP packet received from the NACK buffer 136 and determine whether the RTP packet is included in a non-reference frame or a reference frame based on whether the NRI value is 0. In an embodiment, according to the H.265 standard, the NACK handler 143 may identify a TID value by decoding the header of an RTP packet received from the NACK buffer 136. The TID value indicates the relative importance of the RTP packet and may be different according to a layer of hierarchical P coding. For example, when video compression codec is H.265, the TID value of RTP packets corresponding to frames in the lowest layer (e.g., Layer 1) may be greater than that of RTP packets corresponding to non-reference frames in the highest layer (e.g., Layer 3). The NACK handler 143 may determine that an RTP packet received from the NACK buffer 136 is included in a non-reference frame when the TID value of the RTP packet is the greatest one.

According to various embodiments, when video compression codec is H.264, the NACK handler 143 may terminate the operation when the NRI value is 0. In other words, when an RTP packet requested to be retransmitted because of reception failure of an external device (not shown) is included in a non-reference frame, the NACK handler 143 may ignore the NACK request. This is because an RTP included in a non-reference frame does not cause any problem in playing a video even if failed to be transmitted.

The NACK handler 143 may retransmit the packets included in a reference frame in operation S240. For example, when the NRI value of an RTP packet corresponding to the NACK request is not 0, the NACK handler 143 may retransmit the RTP packet through the wireless transmitter circuit 137. In other words, when the NRI value of the RTP packet is 1, 2, or 3, the RTP packet may be included in a frame that is necessarily referred to for decoding of another frame. When an RTP packet having an NRI value of 1, 2, or 3 is not retransmitted, an external device (not shown) may fail to decode at least some frames, and accordingly, video playback may not be smooth. Accordingly, the NACK handler 143 may selectively retransmit all RTP packets having NRI values other than 0 among all RTP packets corresponding to the NACK request.

Figure 7:
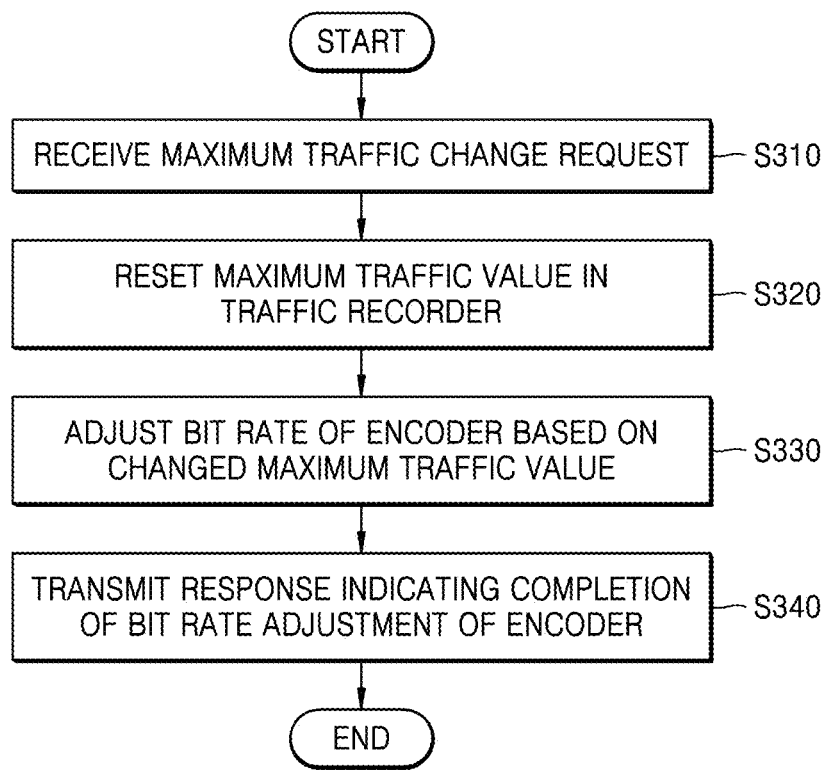
FIG. 7 is a flowchart of an operating method of an electronic device upon receipt of a traffic change request, according to example embodiments.

FIG. 7 is a flowchart of an operating method of an electronic device upon receipt of a traffic change request, according to example embodiments.

Referring to FIG. 7, the electronic device 10 may receive a maximum traffic change request in operation S310. The electronic device 10 may receive the maximum traffic change request through the wireless receiver circuit 141. The wireless receiver circuit 141 may transmit the maximum traffic change request to the traffic handler 142. According to the RFC 5104 standard of the RTP session control protocol, the maximum traffic change request may correspond to a temporary maximum media stream bit rate request (TMMBR). The TMMBR may be transmitted from an external device (not shown) exchanging packets with the electronic device 10. The TMMBR may include information about a maximum bit rate available for the external device. The term maximum bit rate used herein may mean a threshold bit rate. For example, when the external device moves to an area (e.g., the inside of a tunnel, a cell edge, or the like), which has poor reception, the maximum bit rate available for the external device may be degraded. Because the external device may receive RTP packets at the degraded bit rate even if the electronic device 10 transmits the RTP packets at high traffic, packet loss may gradually increase. Accordingly, the external device may include the maximum bit rate in the TMMBR and transmits the TMMBR to the electronic device 10 such that traffic may be adjusted in real time.

The electronic device 10 may reset a maximum traffic value in the traffic recorder 132 in operation S320. The traffic handler 142 may receive the TMMBR from the wireless receiver circuit 141 and identify a maximum bit rate value available for the external device (e.g., a receiver) by decoding the TMMBR. The traffic handler 142 may transmit the maximum bit rate value to the traffic recorder 132. The traffic recorder 132 may receive the maximum bit rate value and reset the maximum traffic value based on the maximum bit rate value. The traffic recorder 132 may compare the changed maximum traffic value with real-time traffic and determine whether the maximum traffic has been exceeded.

The electronic device 10 may adjust a bit rate of the encoder 131 based on the changed maximum traffic value in operation S330. The traffic handler 142 may directly transmit the changed maximum traffic value to the encoder 131 or may calculate an encoding bit rate based on the changed maximum traffic value and transmit the encoding bit rate to the encoder 131. The encoder 131 may adjust the encoding bit rate to perform encoding most (or more) efficiently using changed maximum traffic.

The electronic device 10 may transmit a response, which indicates that the bit rate adjustment of the encoder 131 has been completed, to the external device in operation S340. The response is provided to indicate that the encoding bit rate has been adjusted according to the changed maximum traffic value indicated by the TMMBR and may correspond to a temporary maximum media stream bit rate notification (TMMBN). After exchanging the TMMBR and the TMMBN with each other, the electronic device 10 and the external device may exchange RTP packets according to the changed maximum traffic.

Figure 8:
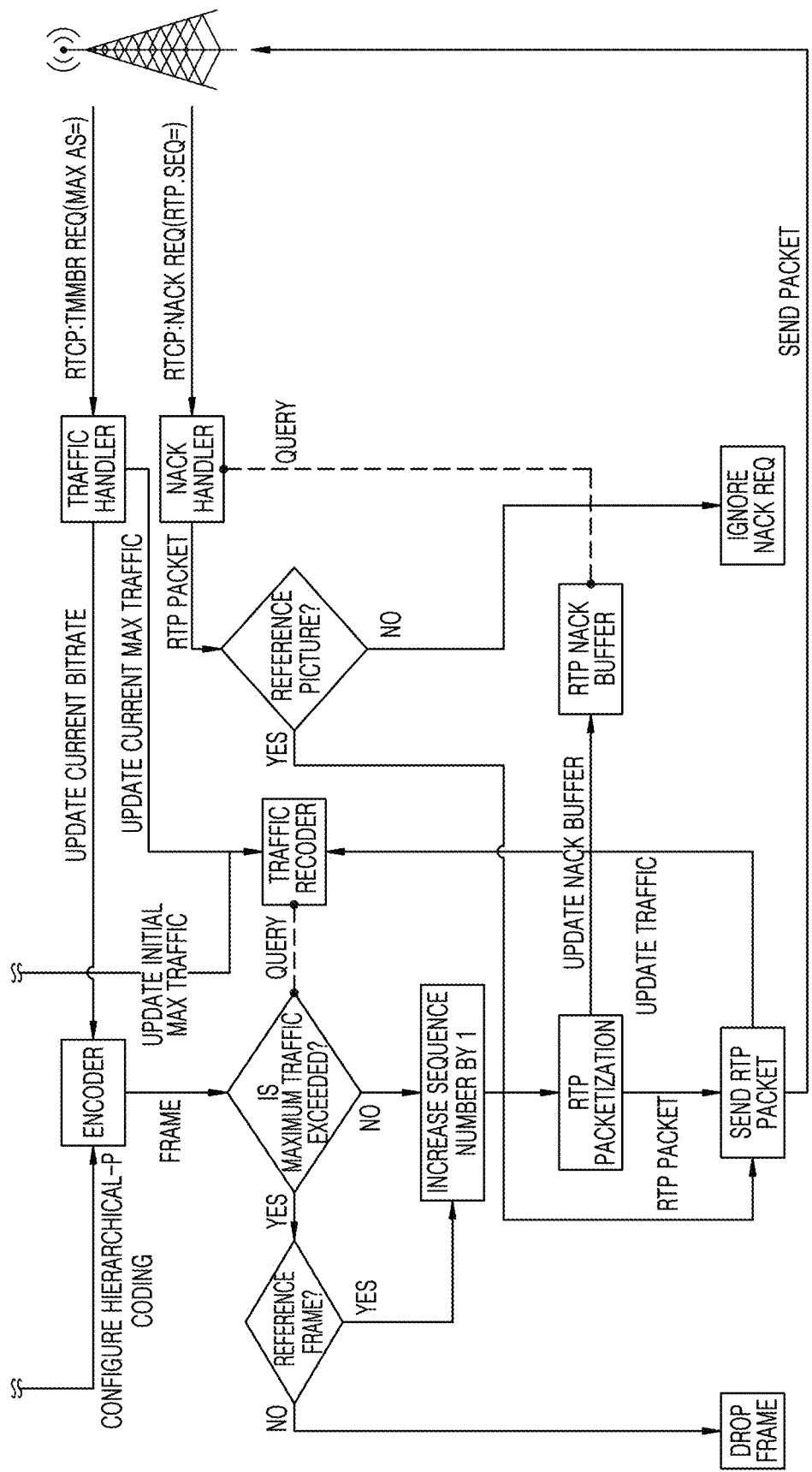
FIG. 8 is a logic flow diagram of the operation of an electronic device according to example embodiments.

FIG. 8 is a logic flow diagram of the operation of an electronic device according to example embodiments.

Referring to FIG. 8, initial setting of the encoder 131 may be performed. For example, the control circuit 120 may configure the encoder 131 to perform hierarchical P coding and transmit an initial traffic setting value to the traffic recorder 132 to update a maximum traffic value. For example, the TMMBR may be transmitted from an external device exchanging packets with the electronic device 10(RTCP: TMMBR REQ(MAX AS=)).

The encoder 131 may determine whether to packetize an encoded frame. For example, the encoder 131 may transmit a frame to the packet generating circuit 133, and the packet generating circuit 133 may use the packetization decision circuit 134. The packetization decision circuit 134 may determine whether transmission traffic exceeds maximum traffic upon receipt of the frame. When the transmission traffic does not exceed the maximum traffic, the frame may be packetized. When the transmission traffic exceeds the maximum traffic, the packetization decision circuit 134 may determine whether the frame corresponds to a reference frame or a non-reference frame. This is because the transmission traffic needs to be reduced when the transmission traffic exceeds the maximum traffic. When the frame corresponds to a non-reference frame, an external device (not shown) may have no problems in playing a video even if the frame is not packetized and transmitted to the external device. Accordingly, the packetization decision circuit 134 may not packetize the frame but drop the frame when the frame corresponds to a non-reference frame. When the frame corresponds to a reference frame, packetization decision circuit 134 may generate packets for the reference frame. Because, if the reference frame is not packetized and transmitted to the external device, a video played by the external device may be choppy or jittery. Thus, regardless of the fact that the transmission traffic exceeds the maximum traffic, the reference frame may be packetized and transmitted to the external device. Accordingly, the packetization decision circuit 134 may determine to packetize the frame corresponding to a reference frame.

The packet generating circuit 133 may perform RTP packetization on the frame, on which packetization has been determined. The packet generating circuit 133 may divide the frame into at least one RTP packet. For example, the first frame I1, which is the key frame, may be divided into eight RTP packets. The second frame P2 referring to the first frame I1 includes a motion vector indicating the first frame I1 and difference values between the first frame I1 and macroblocks and may thus be divided into a smaller number of RTP packets (e.g., five RTP packets) than the first frame I1. The packet generating circuit 133 may generate and allocate a sequence number to each or one or more RTP packet. The sequence number indicates the place of an RTP packet in the sequence of RTP packets generated by the packet generating circuit 133. The external device may receive the RTP packet and include the sequence number of the RTP packet in a NACK request when the RTP packet has failed to be received by the external device (RTCP: NACK REQ(RTP.SEQ=)). In other words, each (or one or more) time when the packet generating circuit 133 generates an RTP packet, the sequence number may be increased by 1.

The packet generating circuit 133 may update the RTP packet in the NACK buffer 136 and transmit the RTP packet to the external device. The NACK buffer 136 may temporarily store a plurality of RTP packets and receive a query from the NACK handler 143 when the NACK handler 143 receives a NACK request. The NACK buffer 136 may output RTP packets, which correspond to sequence numbers requested by the query, to the NACK handler 143.

According to various embodiments, the NACK handler 143 may receive a NACK request. The NACK request may include the sequence number of an RTP packet that has not been received by the external device. The external device may include sequence numbers of up to sixteen RTP packets in the NACK request. Upon receiving the NACK request, the NACK handler 143 may identify a sequence number included in the NACK request and query the NACK buffer 136 for the sequence number. The NACK handler 143 may not determine whether the RTP packet is included in a reference frame or a non-reference frame based on only the sequence number. The NACK handler 143 may receive the RTP packet, which corresponds to the sequence number indicated by the NACK request, from the NACK buffer 136.

The NACK handler 143 may retransmit the RTP packet to the external device when the RTP packet is included in a reference frame. This is because if an RTP packet included in a reference frame is not transmitted to an external device (not shown), a video may be jittery when the external device plays the video. When the RTP packet that corresponds to the sequence number indicated by the NACK request is included in a non-reference frame, the NACK handler 143 may ignore the NACK request and terminate the operation.

Accordingly, according to some example embodiments, efficiency of transmission of RTP packets may be improved, and occurrences of a video playback error and/or occurrences of jittery playback may be reduced or prevented.

Figure 9:
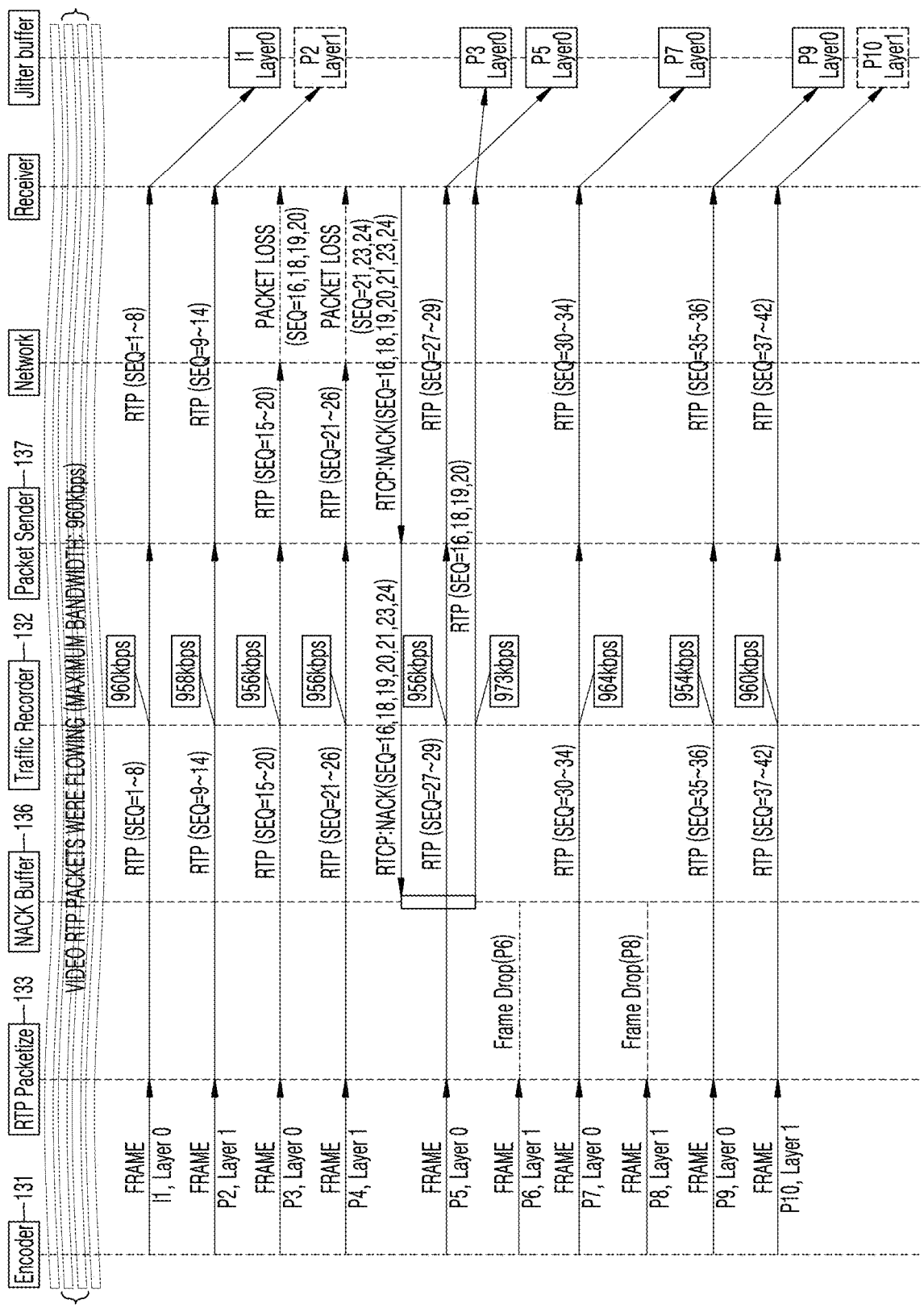
FIG. 9 is a signal exchange diagram according to example embodiments.

FIG. 9 is a signal exchange diagram according to example embodiments.

Referring to FIG. 9, the encoder 131 may encode the first frame I1 and the second through tenth frames P2 through P10 according to hierarchical P coding. According to an embodiment, the first frame I1 and the second through tenth frames P2 through P10 may be alternately arranged in a lower layer Layer0 and an upper layer Layer1.

According to an embodiment, at least one selected from the first frame I1 and the second through tenth frames P2 through P10 may be packetized by the packet generating circuit 133 including the packetization decision circuit 134 and packetization circuit 135. However, the number of RTP packets into which each or one or more frame is divided may be different. For example, the first frame I1 may be divided into 1st through 8th RTP packets by the packet generating circuit 133, and the second frame P2 may be divided into 9th through 14th RTP packets by the packet generating circuit 133. Real-time transmission traffic during the period of the first frame I1 is 960 kbs and real-time transmission traffic during the period of the second frame P2 is 958 kbs, and accordingly, all packets of the first and second frames I1 and P2 may be successfully transmitted to an external device (not shown) without exceeding a maximum traffic of 960 kbs. Because the electronic device 10 backs up the 1st through 14th RTP packets in the NACK buffer 136 before transmitting the 1st through 14th RTP packets to the external device, the NACK buffer 136 may also store the 1st through 14th RTP packets therein.

The external device may fail to receive, via a receiver, at least some of RTP packets corresponding to the third frame P3. The receiver of the external device may be equivalent to the wireless receiver circuit 141. For example, 15th through 20th RTP packets may correspond to the third frame P3. The external device may fail to receive four RTP packets among six RTP packets corresponding to the third frame P3. For example, the external device may fail to receive the 16th RTP packet, the 18th RTP packet, the 19th RTP packet, and/or the 20th RTP packet.

The external device may fail to receive at least some of RTP packets corresponding to the fourth frame P4. For example, 21st through 26th RTP packets may correspond to the fourth frame P4. The external device may fail to receive three RTP packets among six RTP packets corresponding to the fourth frame P4. For example, the external device may fail to receive the 21st RTP packet, the 23rd RTP packet, and the 24th RTP packet.

The electronic device 10 may receive a NACK request from the external device. The NACK request may include information about sequence numbers of the RTP packets that have not been received by the external device. For example, the NACK request may include sequence numbers of the 16th, 18th, 19th, 20th, 21st, 23rd, and/or 24th RTP packets.

According to various embodiments, the NACK handler 143 and the packet generating circuit 133 may independently operate in parallel. For example, the NACK handler 143 may receive the NACK request, load transmission-failed RTP packets from the NACK buffer 136, and determine to retransmit only RTP packets that are included in a reference frame among the loaded RTP packets. The retransmission may be performed regardless of whether the maximum traffic is exceeded. RTP packets are determined to be retransmitted because a video may be jittery on playback or a streaming service may be uneven if the RTP packets are not retransmitted to the external device. While the NACK handler 143 is receiving the NACK request, querying the NACK buffer 136 for RTP packets, and determining to retransmit the 16th, 18th, 19th, and/or 20th RTP packets included in the third frame P3, the packet generating circuit 133 may independently determine whether to generate packets with respect to the fifth frame P5. Because real-time transmission traffic is 956 kbs at the time when the packet generating circuit 133 determines whether to generate RTP packets (e.g., 27th through 29th RTP packets) with respect to the fifth frame P5, the maximum traffic is not exceeded, and accordingly, the RTP packets respectively having sequence numbers 27 through 29 may be generated and transmitted.

The NACK handler 143 may retransmit RTP packets included in a reference frame regardless of whether the maximum traffic is exceeded. For example, because the 16th, 18th, 19th, and/or 20th RTP packets among the RTP packets requested by the NACK request are included in a reference frame corresponding to the lower layer Layer0, the NACK handler 143 may retransmit the 16th, 18th, 19th, and/or 20th RTP packets. The NACK handler 143 may decode the header of each or one or more of the RTP packets requested by the NACK request and identify the 16th, 18th, 19th, and/or 20th RTP packets among the RTP packets based on NRI or TID values which are obtained from the decoding. For example, the NRI value of the header of each or one or more of the 16th, 18th, 19th, and/or 20th RTP packets among the RTP packets requested by the NACK request may not be 0. The NRI value of the header of each or one or more of the 21st, 23rd, and/or 24th RTP packets among the RTP packets requested by the NACK request may be 0. For example, the NACK handler 143 may identify the TID value of each or one or more of the RTP packets requested by the NACK request. The TID value of each or one or more of the 16th, 18th, 19th, and/or 20th RTP packets among the RTP packets requested by the NACK request may be less than the TID value of each or one or more of the 21st, 23rd, and/or 24th RTP packets thereamong. The NACK handler 143 may identify the 16th, 18th, 19th, and/or 20th RTP packets having less TID values and retransmit the 16th, 18th, 19th, and/or 20th RTP packets. The NACK handler 143 may retransmit the 16th, 18th, 19th, and/or 20th RTP packets, each or one or more of which has an NRI value of 0 or a low TID value, to the external device. However, because this retransmission is performed even when a maximum bandwidth is exceeded, real-time transmission traffic at the time of the retransmission may be greater than the maximum bandwidth. For example, referring to FIG. 9, transmission traffic at the time when the NACK handler 143 performs the retransmission is 973 kbs that exceeds the maximum traffic of 960 kbs.

According to various embodiments, the packet generating circuit 133 may determine to drop the sixth frame P6. In detail, the packet generating circuit 133 may receive the sixth frame P6 from the encoder 131 and determine whether to perform packetization using the packetization decision circuit 134. As described above, because the transmission traffic at the time when the packet generating circuit 133 receives the sixth frame P6 from the encoder 131 is 973 kbs, the packetization decision circuit 134 may determine that the real-time transmission traffic exceeds the maximum traffic. Thereafter, in a state where the maximum traffic is fully occupied, the packetization decision circuit 134 may determine whether to decrease traffic share by dropping a frame or whether to perform RTP packetization on a frame and transmit RTP packets regardless of the maximum traffic to allow the external device to play a video without flicker or jitter. Referring to FIG. 9, the sixth frame P6 may be in the upper layer Layer 1. In other words, it may be seen that the sixth frame P6 is decoded with reference to the fifth frame P5, and there are no other frames that are decoded with necessary reference to the sixth frame P6. The packetization decision circuit 134 may determine that a video does not have jitter even when the sixth frame P6 is not transmitted to the external device because the sixth frame P6 is a non-reference frame and determine to drop the sixth frame P6. Similarly, the packetization decision circuit 134 may identify the real-time transmission traffic upon receipt of the seventh frame P7 from the encoder 131 and identify that the real-time transmission traffic exceeds the maximum traffic of 960 kbs. However, the packetization decision circuit 134 may identify that the seventh frame P7 is a reference frame. In other words, the seventh frame P7 may be necessarily referred to for decoding of the eighth frame P8 and the ninth frame P9. The packetization decision circuit 134 may determine that errors and jitter occur in video playback when the seventh frame P7 is not transmitted to the external device. Because the seventh frame P7 is a reference frame, the packet generating circuit 133 may divide the seventh frame P7 into five RTP packets despite that the maximum traffic is fully occupied. The five RTP packets may correspond to the 30th to 34th RTP packets. Descriptions of the eighth frame P8 are the same as those of the sixth frame P6 and thus omitted. Descriptions of the ninth and tenth frames P9 and P10 are the same as those of the first frame I1 or the second frame P2 and thus omitted.

According to various embodiments, the external device may successfully decode the first frame I1, the second frame P2, the third frame P3, the fifth frame P5, the seventh frame P7, the ninth frame P9, and/or the tenth frame P10. For example, the external device may further include a jitter buffer. The jitter buffer may temporarily store a plurality of frames in order of encoding sequence not in order of received time. The first frame I1, the second frame P2, the fifth frame P5, the ninth frame P9, and/or the tenth frame P10 may be successfully transmitted from the electronic device 10 to the external device because the maximum traffic is not fully occupied.

The third frame P3 may be the same as the fourth frame P4 in that some RTP packets of the third frame P3 fail to be transmitted. However, RTP packets included in the third frame P3 are retransmitted while RTP packets included in the fourth packet P4 are not transmitted despite a retransmission request. This is because the third frame P3 is a reference frame and thus necessary for video playback of the external device and the fourth frame P4 is a non-reference frame and does not cause flicker or an error in video playback even when the fourth frame is not transmitted to the external device.

The sixth frame P6 may be the same as the seventh frame P7 in that the maximum bandwidth is fully occupied at the time when the sixth frame P6 is packetized. However, the sixth frame P6 is dropped before being packetized, and the seventh frame P7 is packetized into the 30th through 34th RTP packets and transmitted to the external device. This is because the sixth frame P6 is a non-reference frame and video playback is possible even when the sixth frame P6 is not transmitted to the external device. The seventh frame P7 is a reference frame and thus necessarily transmitted for video playback of the external device. The external device fails to receive the sixth frame P6 and the eighth frame P8 but may not recognize packet loss for the sixth frame P6 and the eighth frame P8 because an RTP sequence number is recognized as being sequentially increased.

Figure 10:
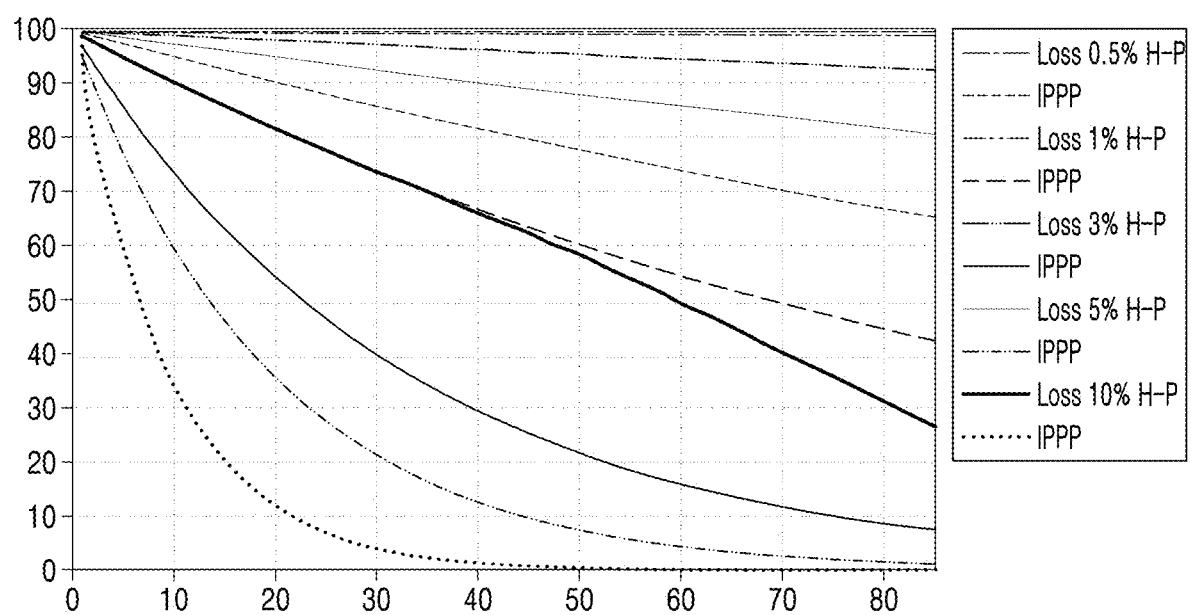
FIG. 10 is a graph of percentages of video frames having no playback error, according to example embodiments.

FIG. 10 is a graph of percentages of video frames having no playback error, according to example embodiments.

Referring to FIG. 10, the horizontal axis of the graph is the number of transmitted RTP packets and the vertical axis of the graph is the probability of obtaining a video having no playback error. Hereinafter, it is assumed that an I-frame is generated at an interval of one second, 85 RTP packets are transmitted for one second, and the portion of non-reference frames among frames generated according to hierarchical P (HP) coding is 20%.

According to various embodiments, Table 1 below shows the probabilities of obtaining a video having no playback error in the cases of IPPP coding and HP coding with respect to different loss ratios of RTP packets.

TABLE 1

| Loss Ratio | Time [s] | IPPP Coding | HP Coding |
| --- | --- | --- | --- |
| 0.5% | 0.5 | 81.01% | 99.89% |
|  | 1 | 65.30% | 99.78% |
| 1% | 0.5 | 65.56% | 99.58% |
|  | 1 | 42.55% | 99.15% |
| 3% | 0.5 | 27.82% | 96.28% |
|  | 1 | 7.50% | 92.63% |
| 5% | 0.5 | 11.59% | 90.02% |
|  | 1 | 1.27% | 80.83% |
| 10% | 0.5 | 1.19% | 64.78% |
|  | 1 | 0.01% | 26.91% |

Referring to Table 1, it may be seen that in the case where video packets are transmitted and received at a loss ratio of 0.5% (e.g., in a strong electric field environment) and at a loss ratio of 10% (e.g., in a weak electric field environment), the probability of maintaining a video, e.g., of obtaining a seamless video, is greater when HP coding is used than when IPPP coding is used. As described above, according to IPPP coding, only reference P-frames are subsequently generated following an I-frame that is a key frame. In other words, frames based on IPPP coding are all reference frames, and accordingly, when packet loss occurs in at least one frame, sequential decoding may not be performed because packets are hardly likely to be recovered and thus cause a decoding error. For example, it may be seen that the probability of obtaining a seamless video even in the strong electric field environment having a loss ratio of 0.5% is just 65.30%.

Contrarily, HP coding may necessarily include a non-reference frame. Accordingly, in the case where a frame having packet loss is a non-reference frame, a packet receiver may play a video without errors such as flicker or jitter even when not decoding the non-reference frame. According to example embodiments, in the case where a frame having packet loss is a reference frame, packet retransmission is always performed in response to a NACK request regardless of whether a maximum bandwidth is fully occupied, and accordingly, the probability of error occurrence may be further decreased. In a poor communication environment in which a loss ratio is 10% in a weak electric field state, the probability of playing a video without errors is just 0.01% when video packets are transmitted for one second based on IPPP coding but is 26.91% when video packets are transmitted for one second based on HP coding. Based on this fact, it is effective to retransmit a reference frame in response to a NACK request.

One or more of the elements disclosed above may include or be implemented in one or more processing circuitries such as hardware including logic circuits; a hardware/software combination such as a processor executing software; or a combination thereof. For example, the processing circuitries more specifically may include, but not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to embodiments thereof, it will be understood that various changes in form and details may be made therein without departing from the spirit and scope of the following claims.

What is claimed is:

1. An electronic device comprising:
a NACK buffer configured to temporarily store first packets and second packets; and
processing circuitry configured to,
generate a plurality of frames based on hierarchical predictive (P) coding, the plurality of frames including reference frames and non-reference frames, the reference frames depending on decoding of another frame, and the non-reference frames being independent of decoding of another frame,
generate the first packets and the second packets based on the plurality of frames, the first packets forming the reference frames, and the second packets forming the non-reference frames,
transmit the first packets and the second packets to an external device,
receive a NACK request indicating retransmission of target packets that have failed to be received by the external device, and
determine not to retransmit at least some of the retransmission target packets corresponding to the NACK request.

2. The electronic device of claim 1, wherein the at least some of the retransmission target packets correspond to the first packets forming the reference frames.

3. The electronic device of claim 2, wherein the processing circuitry is further configured to:
monitor whether real-time traffic exceeds a threshold traffic; and
retransmit the first packets regardless of whether the threshold traffic is exceeded.

4. The electronic device of claim 2, wherein the processing circuitry is further configured to obtain sequence numbers of the retransmission target packets by decoding the NACK request and query the NACK buffer for packets corresponding to the sequence numbers.

5. The electronic device of claim 4, wherein the processing circuitry is further configured to determine remaining packets of the retransmission target packets received from the NACK buffer, excluding packets having a non-reference indicator (NRI) value of 0, to be the first packets.

6. The electronic device of claim 4, wherein the processing circuitry is further configured to determine remaining packets of the retransmission target packets received from the NACK buffer, excluding packets having a greatest traffic identifier (TID) value, to be the first packets.

7. The electronic device of claim 1, wherein the processing circuitry is further configured to:
monitor real-time transmission traffic;
determine whether the real-time transmission traffic exceeds a threshold traffic; and
receive a signal requesting a change of a maximum traffic value, the signal corresponding to a temporary maximum media bit rate request (TMMBR).

8. The electronic device of claim 7, wherein the processing circuitry is further configured to:
adjust an encoding bit rate based on the TMMBR;

adjust the threshold traffic value based on the TMMBR; and transmit a response signal to the external device in response to completion of the adjustment, the response signal corresponding to a temporary maximum media bit rate notification (TMMBN).

9. An electronic device comprising:
processing circuitry configured to,
 generate a plurality of frames based on hierarchical predictive (P) coding, the plurality of frames including reference frames and non-reference frames, the reference frames depending on decoding of another frame, and the non-reference frames being independent of decoding of another frame,
 determine whether to perform a frame drop with respect to some of the plurality of frames based on transmission traffic and a frame type, the frame drop bypassing packetization of at least one of the plurality of frames,
 generate reference frame packets by packetizing the reference frames and generate non-reference frame packets by packetizing the non-reference frames,
 transmit the reference frame packets and the non-reference frame packets to an external device, and
 monitor whether the transmission traffic exceeds a threshold traffic, the transmission traffic being based on a size of the reference frame packets and the non-reference frame packets transmitted to the external device.

10. The electronic device of claim 9, wherein the processing circuitry is further configured to:
 determine whether the transmission traffic exceeds the threshold traffic; and
 determine not to perform the frame drop when the transmission traffic does not exceed the threshold traffic.

11. The electronic device of claim 10, wherein the processing circuitry is further configured to determine whether a frame corresponding to a time when the threshold traffic is exceeded is included in the reference frames or the non-reference frames in response to the transmission traffic exceeding the threshold traffic.

12. The electronic device of claim 11, wherein the processing circuitry is further configured to:
 determine to packetize the frame corresponding to the time when the threshold traffic is exceeded in response to the frame being included in the reference frames; and
 determine to bypass packetization and drop the frame corresponding to the time when the threshold traffic is exceeded in response to the frame being included in the non-reference frames.

13. The electronic device of claim 9, wherein the processing circuitry is further configured to receive a signal requesting a change of a threshold traffic value,
 wherein the signal corresponds to a temporary maximum media bit rate request (TMMBR).

14. The electronic device of claim 13, wherein the processing circuitry is further configured to:
 adjust an encoding bit rate based on the TMMBR;
 adjust the threshold traffic value based on the TMMBR; and
 transmit a response signal to the external device in response to completion of the adjustment, the response signal corresponding to a temporary maximum media bit rate notification (TMMBN).

15. An electronic device comprising:
a NACK buffer configured to temporarily store first, second, and third packets; and
processing circuitry configured to,
 sequentially generate a first frame, a second frame, and a third frame based on hierarchical predictive (P) coding,
 determine whether to perform packetization on each of the first through third frames,
 generate the first packets corresponding to the first frame, the second packets corresponding to the second frame, and the third packets corresponding to the third frame,
 transmit the first through third packets to an external device,
 monitor real-time transmission traffic and determine whether the real-time transmission traffic exceeds a threshold traffic,
 receive a NACK request indicating retransmission target packets that have failed to be received by the external device, and
 determine not to retransmit at least some of the retransmission target packets corresponding to the NACK request,
wherein the second frame is a non-reference frame independent of decoding of another frame, and
each of the first frame and the third frame is a reference frame depending on decoding of another frame.

16. The electronic device of claim 15, wherein the retransmission target packets include some of the second packets and some of the third packets, and
the processing circuitry is further configured to,
 obtain sequence numbers of the retransmission target packets by decoding the NACK request, and
 query the NACK buffer for packets corresponding to the sequence numbers.

17. The electronic device of claim 16, wherein the processing circuitry is further configured to:
 identify packets included in the second packets among the retransmission target packets based on a non-reference indicator (NRI) value or a traffic identifier (TID) value of each of the retransmission target packets received from the NACK buffer; and
 retransmit packets included in the third packets among the retransmission target packets but not packets included in the second packets,
 wherein the NRI value of each of the second packets is 0, and
 the TID value of each of the second packets is greater than the TID value of each of the third packets.

18. The electronic device of claim 15, wherein the processing circuitry is further configured to:
 determine, based on the real-time transmission traffic, whether the threshold traffic is fully occupied at a time when the second frame is generated;
 generate the second packets corresponding to the second frame in response to the maximum traffic is not being fully occupied; and
 drop the second frame without generating the second packets in response to identification of the second frame as the non-reference frame when the threshold traffic is fully occupied.

19. The electronic device of claim 15, wherein the processing circuitry is further configured to:
 determine, based on the real-time transmission traffic, whether the threshold traffic is fully occupied at a time when the third frame is generated; and generate the third packets corresponding to third frame in response to identification of the third frame as the reference frame when the threshold traffic is fully occupied.

20. The electronic device of claim 15, wherein the processing circuitry is further configured to:
receive a signal requesting a change of a threshold traffic value, the signal corresponding to a temporary maximum media bit rate request (TMMBR); and
adjust an encoding bit rate based on the TMMBR.

* * * * *